(12) United States Patent
Pletka et al.

(10) Patent No.: US 12,366,984 B2
(45) Date of Patent: Jul. 22, 2025

(54) STORAGE POOL RESIZING TO MEET MEMORY ENDURANCE TARGETS

(71) Applicant: International Business Machines Corporation, Armonk, NY (US)

(72) Inventors: Roman Alexander Pletka, Uster (CH); Nikolaos Papandreou, Thalwil (CH); M. Dean Sciacca, Poughkeepsie, NY (US); Timothy J. Fisher, Cypress, TX (US); Aaron Daniel Fry, Richmond, TX (US); Radu Ioan Stoica, Zurich (CH); Charalampos Pozidis, Thalwil (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/340,199

(22) Filed: Jun. 23, 2023

(65) Prior Publication Data

US 2024/0427515 A1 Dec. 26, 2024

(51) Int. Cl.
G06F 3/06 (2006.01)

(52) U.S. Cl.
CPC .......... *G06F 3/0644* (2013.01); *G06F 3/0602* (2013.01); *G06F 3/064* (2013.01); *G06F 3/0679* (2013.01)

(58) Field of Classification Search
CPC ...... G06F 3/0644; G06F 3/0602; G06F 3/064; G06F 3/0679
See application file for complete search history.

(56) References Cited

U.S. PATENT DOCUMENTS

| | | | |
|---|---|---|---|
| 9,558,107 B2 | 1/2017 | Camp et al. | |
| 11,023,150 B2 | 6/2021 | Pletka et al. | |
| 11,119,672 B2 | 9/2021 | Natarajan | |
| 11,126,360 B2 | 9/2021 | Stoica | |
| 11,182,089 B2 | 11/2021 | Pletka et al. | |
| 11,797,199 B2 * | 10/2023 | Pletka | G06F 3/0688 |
| 12,093,171 B2 * | 9/2024 | Pletka | G06F 12/0246 |
| 2010/0017555 A1 * | 1/2010 | Chang | G06F 12/0246 |
| | | | 711/170 |
| 2015/0058530 A1 | 2/2015 | Reddy | |

(Continued)

FOREIGN PATENT DOCUMENTS

WO 2024/261554 A1 12/2024

OTHER PUBLICATIONS

"Proactive Disabling Relief Valve to Ensure Proper Pool Resizing," Aug. 31, 2020, 6 pages, IPCOM/000263454, IP.com.

(Continued)

*Primary Examiner* — Zhuo H Li
(74) *Attorney, Agent, or Firm* — CHIP LAW GROUP

(57) ABSTRACT

A non-volatile memory includes physical blocks each including a respective plurality of cells, where each cell is capable of storing multiple bits of data. A controller maintains dynamically resizable pools of physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory.

19 Claims, 11 Drawing Sheets

(56) References Cited

U.S. PATENT DOCUMENTS

| | | | |
|---|---|---|---|
| 2016/0085612 A1* | 3/2016 | Liu | G06F 11/073 |
| | | | 714/6.13 |
| 2018/0373438 A1 | 12/2018 | Bennett et al. | |
| 2021/0294737 A1* | 9/2021 | Wang | G06F 12/0822 |
| 2022/0066638 A1* | 3/2022 | Luo | G06F 3/064 |
| 2023/0010632 A1 | 1/2023 | Pletka | |

OTHER PUBLICATIONS

Malventano, "Micron M600 SSD Review—Digging into Dynamic Write Acceleration," Sep. 29, 2014, 9 pages, accessed online from https://pcper.com/2014/09/micron-m600-ssd-review-digging-into-dynamic-write-acceleration/.

International Searching Authority, Notification of Transmittal of the International Search Report and the Written Opinion of the International Searching Authority, Jun. 21, 2024, 10 pages, International Application No. PCT/IB2024/054880.

* cited by examiner

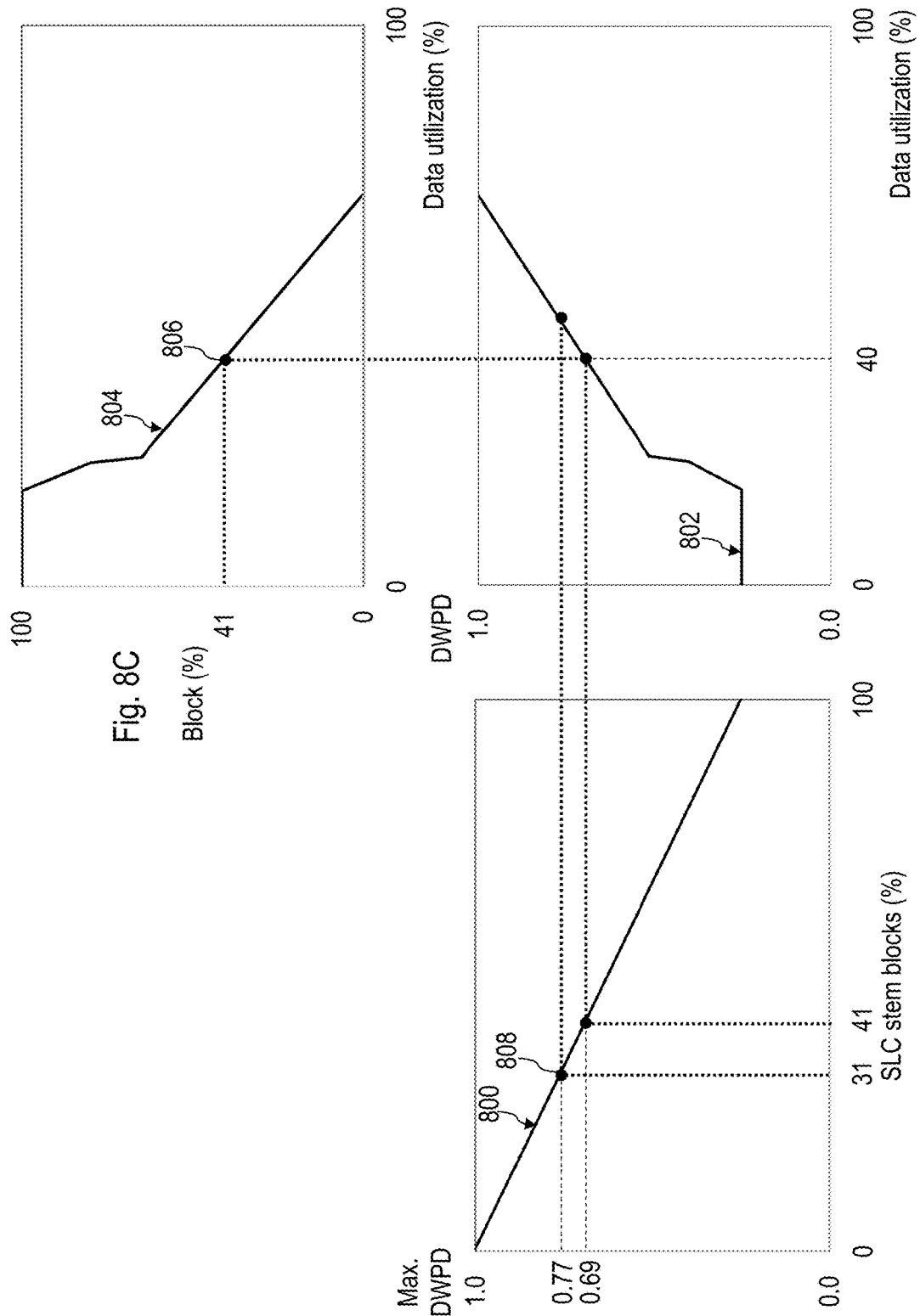

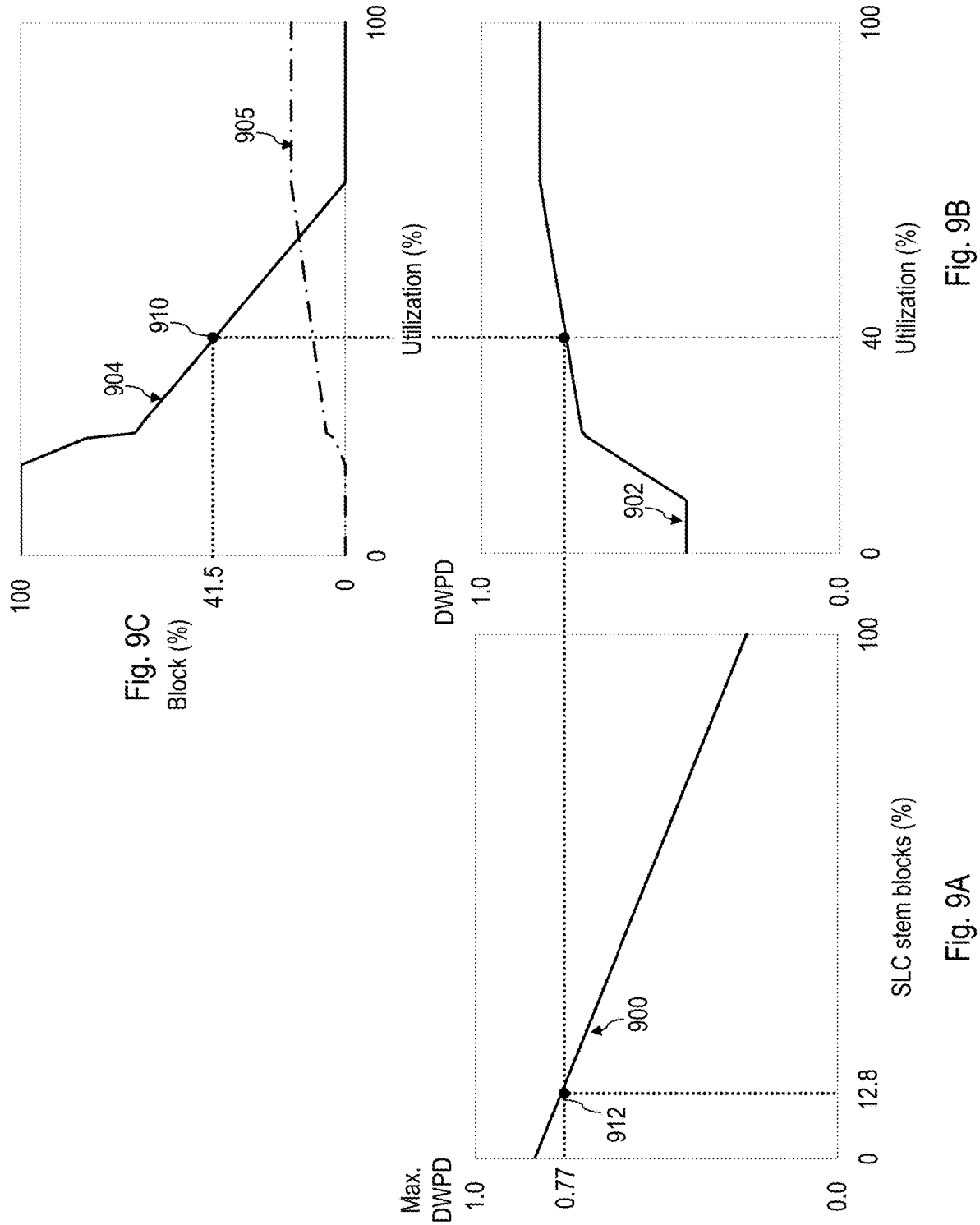

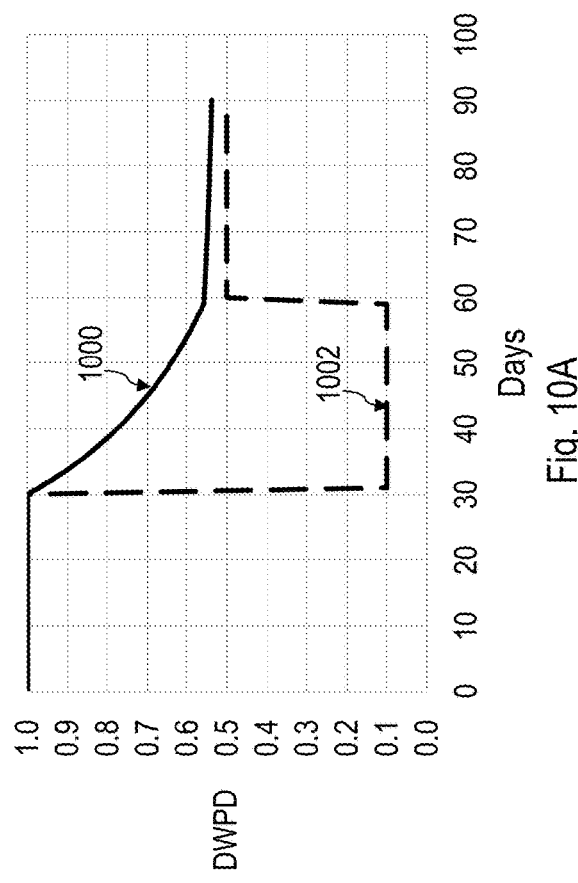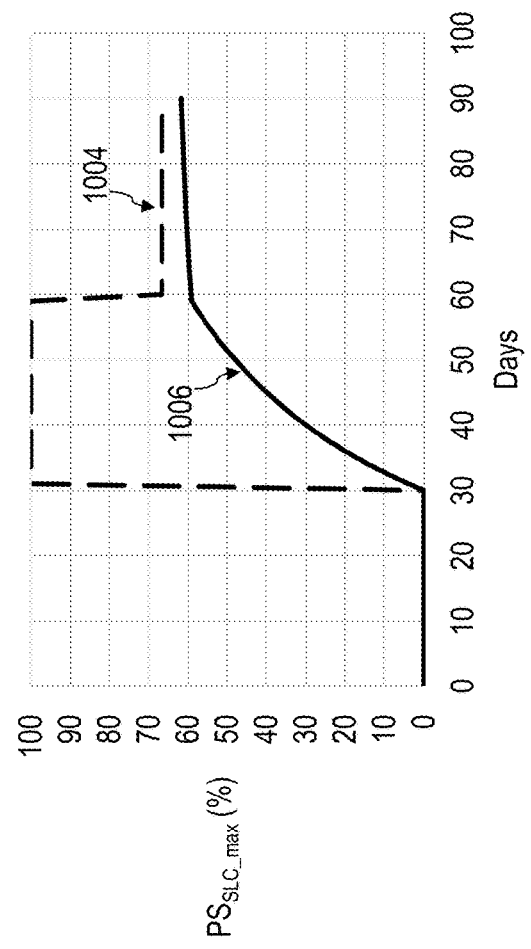

STORAGE POOL RESIZING TO MEET MEMORY ENDURANCE TARGETS

BACKGROUND OF THE INVENTION

This disclosure relates to data processing and data storage, and more specifically, to a non-volatile storage system in which physical blocks of memory are capable of operating in differing storage modes providing differing per-cell bit storage densities. Still more particularly, the disclosure relates to techniques for resizing pools of physical blocks having differing storage densities in order to meet endurance targets for the non-volatile storage system.

NAND flash memory is an electrically programmable and erasable non-volatile memory technology that stores one or more bits of data per memory cell as a charge on the floating gate of a transistor or a similar charge trap structure. The amount of charge on the floating gate or charge trap structure modulates the threshold voltage of the transistor. By applying a proper read voltage and measuring the amount of current, the programmed threshold voltage of the memory cell can be determined, and thus the stored information can be detected. In a typical implementation, a NAND flash memory array is organized in physical blocks (also referred to as "erase blocks") of memory, each of which includes multiple physical pages each in turn containing a multiplicity of memory cells. By virtue of the arrangement of the word and bit lines utilized to access the memory cells, flash memory arrays have generally been programmed on a page basis, but erased on a block basis.

Flash storage technology has seen an impressive growth in bit storage density over the past decade, driven by the objective of decreasing the price per gigabyte of flash storage. One of the key drivers of this trend is the steady increase in the number of bits stored per flash cell. For example, the number of bits that can be stored per flash cell has steadily increased from one (Single Level Cell (SLC)) to two (Multi-Level Cell (MLC)) to three (Three Level Cell (TLC)) and, most recently, to four (Quad Level Cell (QLC)). The increased number of bits that can be stored per flash cell comes at the cost of decreased endurance and performance as the number of bits per cell increases.

Enterprise-class flash controllers employ a variety of techniques to ameliorate the endurance and performance limitations of new generations of the NAND flash memory. For example, flash controllers may employ one or more flash management techniques, including implementing advanced error correction codes, adjusting voltage levels to reduce bit error rate, reducing internal garbage collection overhead by segregating data based on write heat, managing blocks based on block wear (i.e., health binning), and performing health-aware wear leveling and data placement. Despite the longevity and performance gains contributed by these advanced flash management techniques, as bit density continues to grow, the existing flash management techniques alone cannot guarantee an acceptable device lifetime.

One promising avenue for increasing device endurance is to take advantage of the ability of NAND flash memory to operate in multiple modes. For example, some NAND flash memories support both a low-density (e.g., SLC or MLC) mode in which certain selected blocks store only fewer bit(s) per cell and a high-density (e.g., TLC or QLC) mode in which other blocks are configured to store a greater number of bits per cell. Existing flash controllers that support multiple operating modes (so-called "hybrid controllers") often employ a tiered architecture in which incoming host writes are first stored in the blocks of a low-density storage pool (e.g., a SLC or MLC pool). When storage in the low-density storage pool is exhausted, the flash controller initiates a destaging process that frees space in the low-density storage pool by moving data from the low-density storage pool to a high-density storage pool. The flash controller can then manage data residing in the different storage pools, for example, by periodically performing garbage collection and relocating valid data between storage pools.

In newer NAND flash technologies, for example, those employing charge trap devices, data retention is one of the most significant performance challenges. For example, extended program/erase cycling of blocks in the low-density storage mode has been found to significantly negatively affect retention characteristics of the block if it is subsequently transitioned to operate in the high-density storage mode. The present disclosure consequently appreciates that pool resizing through the transfer of blocks between the low-density and high-density storage pools must be handled with care in order to satisfy endurance constraints, which may be expressed, for example, as a specified lifetime (e.g., a certain term years) at a given write utilization (e.g., drive writes per day (DWPD)). In charge trap devices, endurance constraints may further be aggravated due to retention constraints (e.g., a minimum power-off data retention time).

BRIEF SUMMARY

The present disclosure provides a hybrid storage architecture that biases block allocation to the low-density storage pool to provide improved read latency and decreases the size of the low-density storage pool based on endurance constraints.

A non-volatile memory includes physical blocks each including a respective plurality of cells, where each cell is capable of storing multiple bits of data. In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured to dynamically resize the low-density and the high-density pools based on data utilization of the non-volatile memory.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller dynamically resizes the low-density and the high-density pools based on data utilization of the non-volatile memory. Resizing the low-density and high-density pools can include determining a number of physical blocks to transfer between the low-density and high-density pools based on a minimum of a first pool size determined based on write utilization and a second pool size determined based on data utilization.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller initially dynamically resizes the low-density and high-density pools based on the data utilization exceeding a pool resizing threshold.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that, based on transferring some of the physical blocks in the low-density pool into the high-density pool, the controller permanently allocates a subset of the physical blocks in the low-density pool as compaction blocks dedicated to compaction of data written into physical blocks of the low-density pool for storage in physical blocks of the high-density pool.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured to determine write utilization of the non-volatile memory system based on an elapsed portion of a projected lifetime of the non-volatile memory and an average write utilization over the elapsed portion.

In at least one embodiment, a controller maintains dynamically resizable pools of physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller dynamically resizes the low-density and the high-density pools based on data utilization of the non-volatile memory. In some embodiments, the controller can determine a number of physical blocks to transfer between the low-density and high-density pools based on a minimum of a first pool size determined based on write utilization and a second pool size determined based on data utilization. In some embodiments, the controller can be configured such that the controller initially dynamically resizes the low-density and high-density pools based on the data utilization exceeding a pool resizing threshold. In some embodiments, the controller can be configured such that, based on transferring some of the physical blocks in the low-density pool into the high-density pool, the controller permanently allocates a subset of the physical blocks in the low-density pool as compaction blocks dedicated to compaction of data written into physical blocks of the low-density pool for storage in physical blocks of the high-density pool. In some embodiments, the controller can be configured to determine write utilization of the non-volatile memory system based on an elapsed portion of a projected lifetime of the non-volatile memory and an average write utilization over the elapsed portion. In some cases, multiple of these embodiments can be implemented in combination.

BRIEF DESCRIPTION OF THE SEVERAL VIEWS OF THE DRAWINGS

FIGS. 8A-8C are graphs depicting an exemplary technique by which a controller can determine an amount of pool resizing to be performed based on write utilization and data utilization in a hybrid storage architecture that does not employ compaction in accordance with one embodiment;

FIGS. 9A-9C are graphs illustrating an exemplary technique by which a controller can determine an amount of pool resizing to be performed based on write utilization and data utilization in a hybrid storage architecture employing compaction in accordance with one embodiment; and FIGS. 10A-10B are graphs depicting differing exemplary techniques by which a controller can determine write utilization of a non-volatile memory system in accordance with various embodiments.

DETAILED DESCRIPTION

Figure 1A:
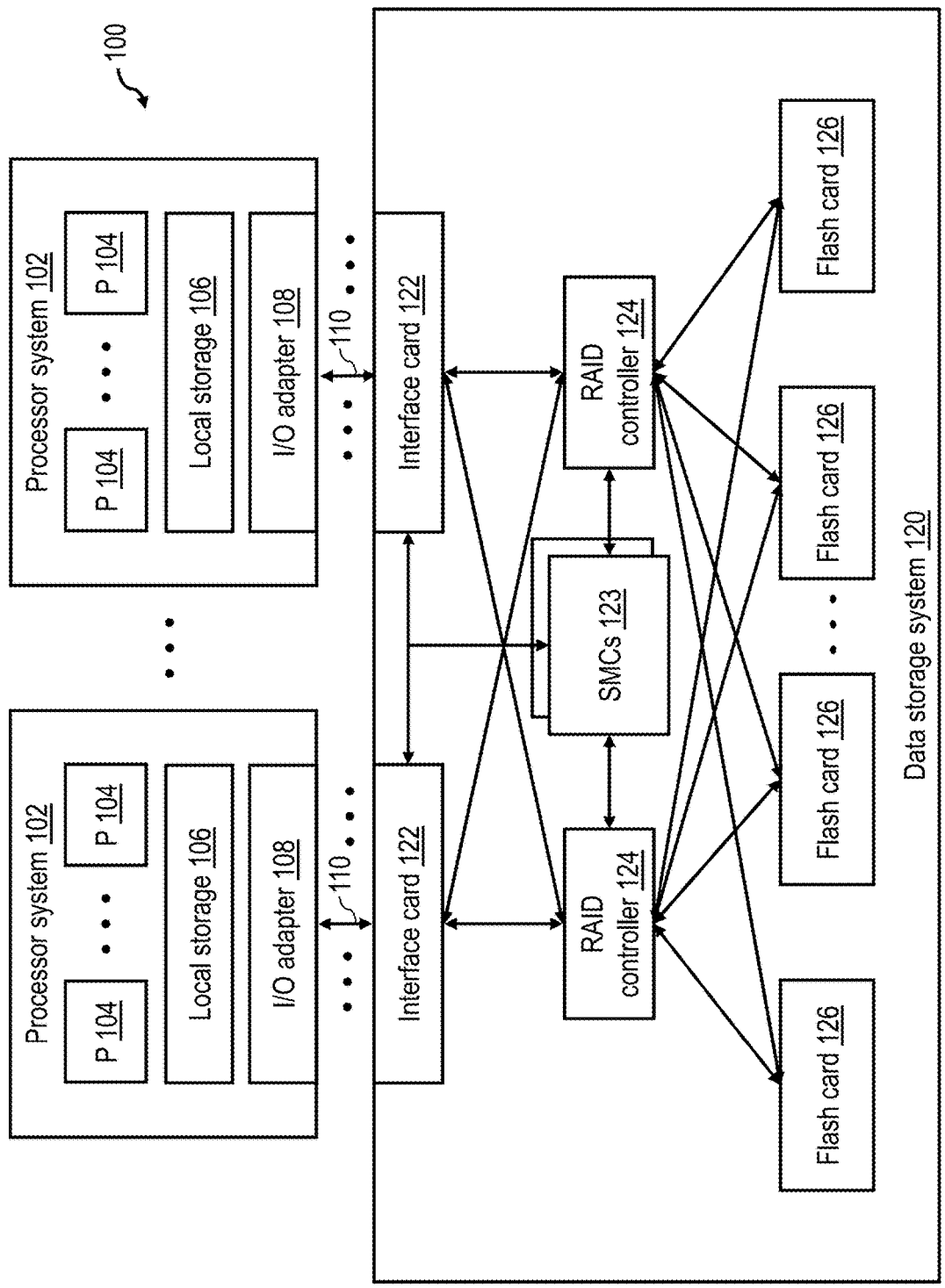
FIG. 1A is a high-level block diagram of a data processing environment in accordance with one embodiment.

With reference to the figures and with particular reference to FIG. 1A, there is illustrated a high-level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWERM series of servers available from International Business Machines Corporation), or a mainframe computer system. A processor system 102 can also be an embedded processor system using various processors such as ARM®, POWER, Intel® x86, Apple® silicon, or any other processor combined with any of memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics (NVMe-oF), etc. I/O requests communicated via I/O channel 110 include read requests by which a processor system 102 requests data from data storage system 120 and write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
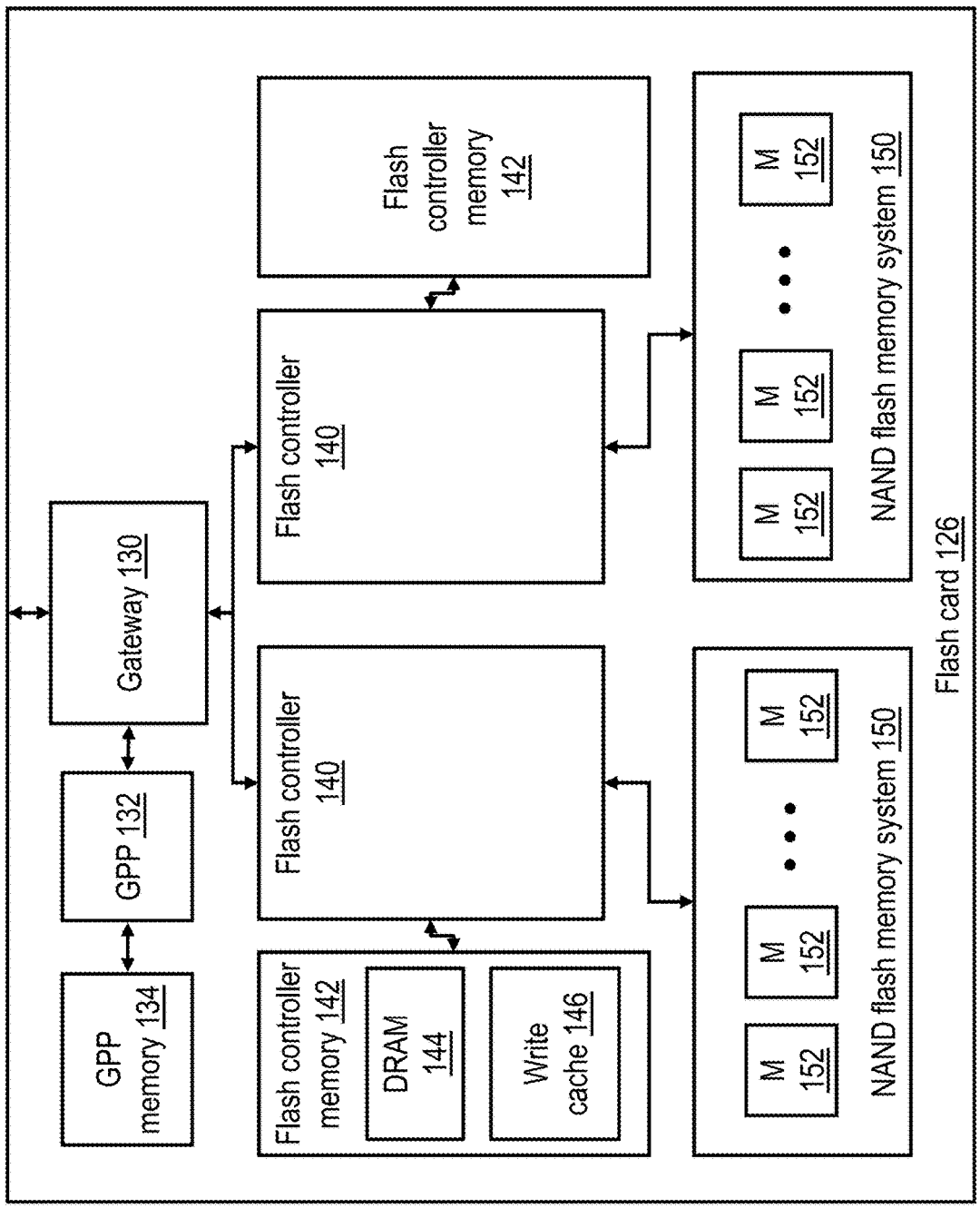
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142. As illustrated, flash controller memory 142 can include volatile memory, such as Dynamic Random Access Memory (DRAM) 144, as well as a non-volatile write cache 146. In embodiments in which flash controllers 140 are implemented with an FPGA, GPP 132 may program and configure flash controllers 140 during start-up of data storage system 120. After startup, in general operation flash controllers 140 receive read and write requests from gateway 130 that request to read data stored in NAND flash memory system 150 and/or to store data in NAND flash memory system 150. Flash controllers 140 service read requests, for example, by accessing NAND flash memory system 150 or by accessing a read cache (not illustrated) associated with NAND flash memory system 150. Flash controllers 140 services write requests, for example, by writing the specified write data into write caches 146. Flash controllers 142 can thereafter destage the write data from write caches 146 to NAND flash memory systems 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored, at least partially, in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, which can be configured, for example, as Single-Level Cell (SLC), Multi-Level Cell (MLC), Three Level Cell (TLC), or Quad Level Cell (QLC) NAND flash memory. The effective storage capacity provided by flash memory storage devices 152 can be increased through the implementation of data compression, for example, by flash controllers 140 and/or high-level controllers, such as GPPs 132, RAID controllers 124 or SMCs 123.

Figure 2:
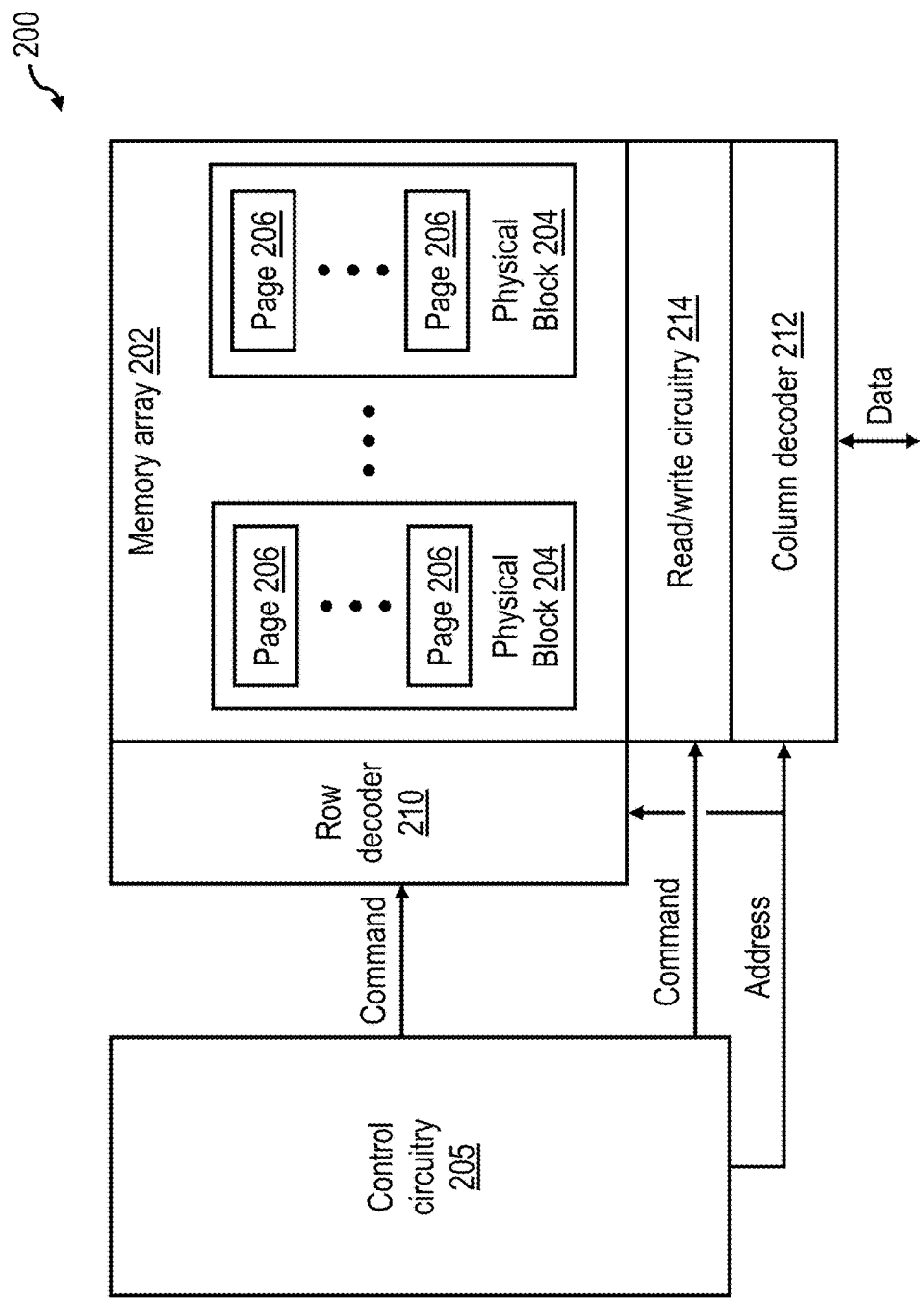
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2, the memory cells within memory array 202 are physically arranged in multiple physical blocks 204, each in turn including multiple physical pages 206. These pages can be managed in page groups, which can each be formed, for example, of all the pages coupled to a common wordline, of all pages in one or more layers in a 3D NAND flash, of a set of pages in one or more layers, or generally of pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. In addition, physical pages 206 in a block 204 are generally programmed sequentially. As a result of the sequential write process, data that is overwritten cannot be overwritten in place. Rather, the old data will be invalidated at the old physical location, and its space will be occupied until garbage collection is performed. It should be appreciated in this regard that the LBAs provided by host devices correspond to logical pages within a logical address space, where each logical page may have a size of, for example, 4 kb or 16 kilobytes (kB). Physical pages 206 may have a size of, for example, 16 kb. As logical pages may further be compressed, a physical page can thus host multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3A, which is a high-level flow diagram of some of the flash management functions and data structures employed by a controller (e.g., GPP 132 and/or flash controller 140) of a NAND flash memory system 150 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized.

In the illustrated embodiment, each flash controller 140 performs logical-to-physical address translation for an associated set of LBAs using one or more logical-to-physical address translation data structures, such as logical-to-physical translation (LPT) table 300, which can be stored, for example, in the associated flash controller memory 142 or the NAND flash memory system 150. In implementations in which LPT 300 is stored in NAND flash memory system 150, flash controller memory 142 may maintain an LPT cache 301 storing translations for recently accessed in-use LBAs. In some embodiments, flash controller memory 142 may further include an additional logical-to-physical (L2P) cache 303 that maps LBAs that are being relocated to PBAs of physical blocks 204 still having their interfaces open. It should be noted that the logical address supplied to flash controller(s) 140 may be different from the logical address originally supplied to data storage system 120, since various components within data storage system 120 may perform address translation operations between the external devices and the flash controller(s) 140.

The controller (e.g., through flash management code running on the GPP 132) tracks erased physical blocks 204 of NAND flash memory system 150 that are ready to be used in ready-to-use (RTU) queues 306, which may be stored, for example, in GPP memory 134. In some embodiments, flash management code running on the GPP 132 maintains at least one RTU queue 306 per channel and/or plane (i.e., per data bus), and an identifier of each erased or free physical block 204 that is to be reused is enqueued in the RTU queue 306 corresponding to its channel or plane. Additionally, separate RTU queues 306 may be maintained for different health grades, heat bin/write streams, and/or block storage modes (e.g., SLC, MLC, TLC, or QLC). For example, FIG. 3A illustrates one set of one or more RTU queue(s) 306a for tracking physical blocks 204 from a low-density (LD) pool 305 allocated for low-density (e.g., SLC or MLC) storage and one set of one or more RTU queue(s) 306b for tracking physical blocks 204 from a high-density (HD) pool 307 allocated for high-density (e.g., TLC or QLC) storage. Pool membership information for physical blocks 204 can be stored, for example, in GPP memory 124 and/or flash controller memory 142, as physical block metadata. As will be appreciated, in addition to metadata regarding physical blocks 204, GPP memory 124 and/or flash controller memory 142 may additionally store logical block metadata, including one or more "temperatures" or "heats" indicating the frequency of read accesses, write accesses, and/or both read and write accesses to each of a plurality of LBAs. In varying embodiments, the free physical blocks tracked by RTU queues 306a and 306b may be allocated for data storage individually or may be allocated in groups to form block stripes, as is known in the art.

In response to a host write request received from a host, such as a processor system 102, a data placement function 310 of flash controller 140 determines by reference to LPT table 300 or LPT cache 301 whether the target LBA(s) indicated in the host write request is/are currently mapped to physical memory page(s) in NAND flash memory system 150 and, if so, changes the status of each data page currently associated with a target LBA to indicate that the associated data is no longer valid. In addition, data placement function 310 selects a page stripe to store the write data of the write request and any non-updated (i.e., still valid) data from an existing page in a stripe, if any, targeted by the host write request. Assuming the use of block stripes, the selected page stripe may be allocated from either a block stripe already allocated to hold data or from a new block stripe. In a preferred embodiment, the page stripe allocation can be based on the health of the physical blocks available for allocation and the write "heat" (i.e., estimated or measured write access frequency) of the LBA of the write data. Data placement function 310 then writes the host write data, associated error correction information (e.g., cyclic redundancy code (CRC) and error correcting code (ECC) values), and parity information for the page stripe in the selected page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3A.

Flash controller 140 places identifiers of physical blocks 204 that have been fully written into one of occupied block queues 302 (e.g., occupied block queue(s) 302a for low-density pool 305 and occupied block queue(s) 302b for high-density pool 307), which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this unused storage capacity through garbage collection performed by a garbage collection and wear leveling function 312. Garbage collection and wear leveling function 312 selects particular physical blocks 204 or block stripes for relocation of still valid data based on a number of factors including, for example, the health of the physical blocks 204 (or block stripes) and how much of the data within the physical blocks 204 is invalid. In the illustrated example, flash controller 140 implements a separate, respective garbage collection and wear leveling function 312 for each of storage pools 305 and 307 (e.g., garbage collection and wear leveling function 312a for low-density pool 305 and garbage collection and wear leveling function 312b for high-density pool 307).

Garbage collection and wear leveling functions 312a and 312b relocate still-valid garbage collected data into physical blocks 204 assigned to one of storage pools 305, 307. To relocate such data, garbage collection and wear leveling functions 312 issue relocation write requests to request that the valid data of the old physical blocks 204 be written to a new physical block 204 in NAND flash memory system 150. In addition, garbage collection and wear leveling functions 312 update LPT table 300 and/or LPT cache 301 to update the current association between the logical and physical addresses of the data. Once all remaining valid data has been moved from a physical block 204 (and, if needed, a block stripe is dissolved to decompose a garbage-collected block stripe into its constituent physical blocks 204), each of the physical blocks 204 that is a target of garbage collection is then erased under the direction of flash controller 140 and/or the control circuitry 205 of the relevant flash memory module 200, and a corresponding program/erase (P/E) cycle count for each erased physical block 204 is incremented. Based on the health metrics of each erased physical block 204 (e.g., bit error rate (BER) metrics, uncorrectable errors, P/E cycle count, etc.), each erased block 204 can either retired (i.e., withdrawn from use) by the flash management functions (e.g., executed on GPP 132), or alternatively, prepared for reuse by placing an identifier of the newly erased physical block 204 on the appropriate ready-to-use (RTU) queue 306 (e.g., in the associated GPP memory 134). This may also include moving the block to an RTU queue 306a, 306b for the other one of pools 305, 307.

Figure 3A:
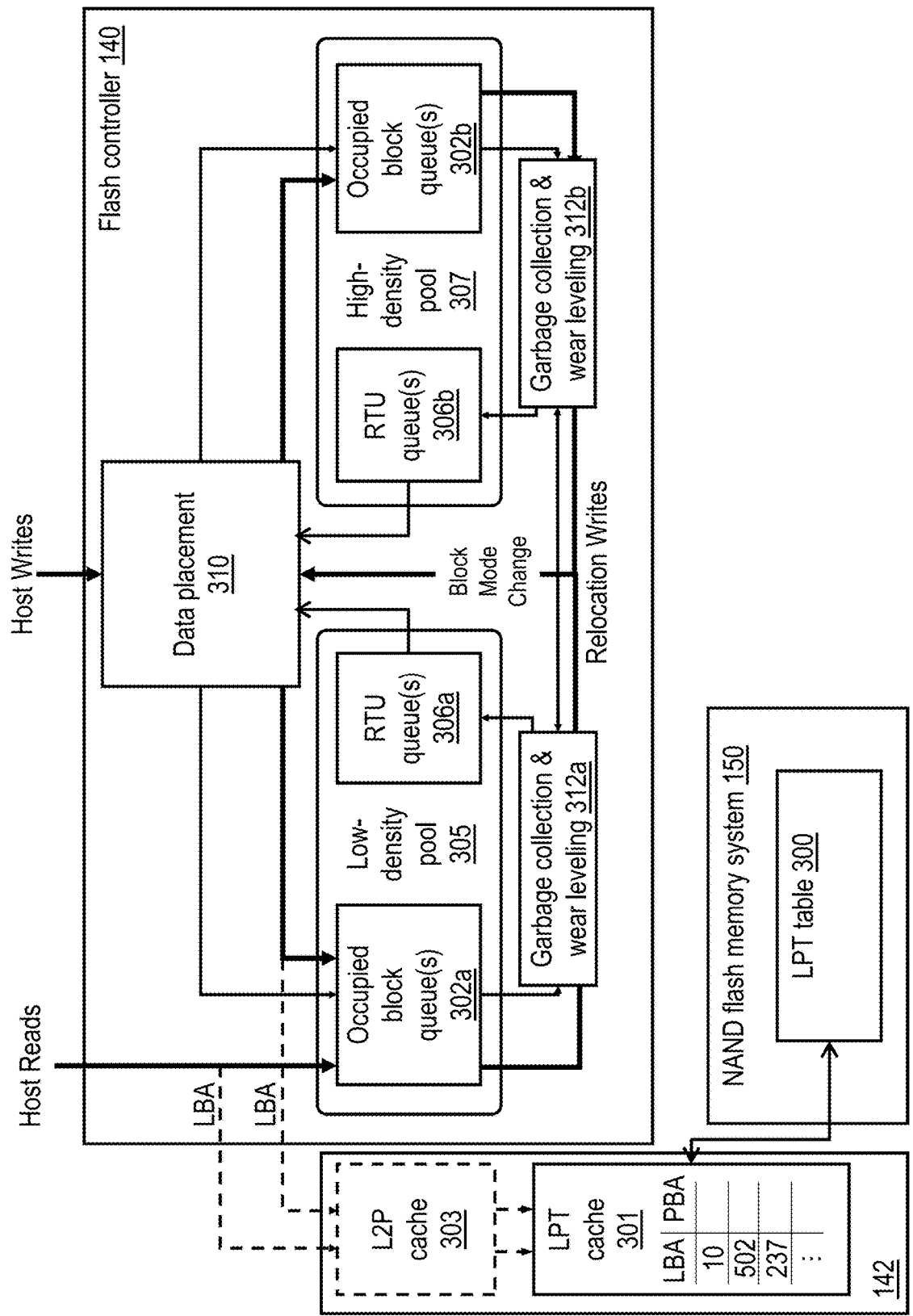
FIG. 3A is a high-level flow diagram of the flash management functions and data structures employed in flash management in accordance with one embodiment.

Although not explicitly illustrated in FIG. 3A, the flash management functions executed on GPP 132 and/or flash controller 140 can additionally include a background health checker. A background health checker, which by definition operates independently of the read and write requests of hosts such as processor systems 102, continuously determines one or more block health metrics for physical blocks 204 recorded in occupied block queues 302. Based on the one or more of the block health metrics, the background health checker may determine to relocate data between physical blocks 204 in the same or different storage pools 305, 307. Key block health metrics that may be monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of both valid and invalid data, thereby ensuring that blocks containing almost entirely invalid data are fully analyzed to determine overall block health.

Data placement function 310 may employ other data placement strategies to avoid and/or reduce imbalance in utilization of pools 305, 307. For example, data placement function 310 may allocate initial storage of host write data between pools 305, 307 based on the relative sizes of pools 305, 307 and, if desirable, initiate dynamic resizing of pools 305, 307. Alternatively or additionally, data placement function 310 may allocate the initial storage of host write data between pools 305, 307 based on the relative data utilization of the storage capacities of pools 305, 307 and dynamically adjust the allocation of data and/or blocks between pools 305, 307 as the data utilizations and/or workload properties vary over time. Note that the "relative pool utilization" refers to the amount of valid data stored in one pool relative to its current pool size, while the "data utilization" denotes the amount of valid data stored relative to the total usable capacity of the NAND flash memory system 150 and hence corresponds to the total capacity used in percent. The term "utilization" can also be used in the context of physical blocks in which the "block utilization" describes the relation between the number of programmed blocks holding valid data and potentially also invalidated data (e.g., used blocks in the occupied block queues 302) and the number of available free blocks (e.g., blocks in the RTU queues 306). In particular, the RTU queue level is reciprocally proportional to the block utilization. The demands of a workload on a flash card 126 or data storage system 120 can also be expressed in terms of a given "write utilization" (e.g., drive writes per day (DWPD), which denotes an amount of data being written in one day including overwrites that corresponds to the total usable capacity.

Figure 3B:
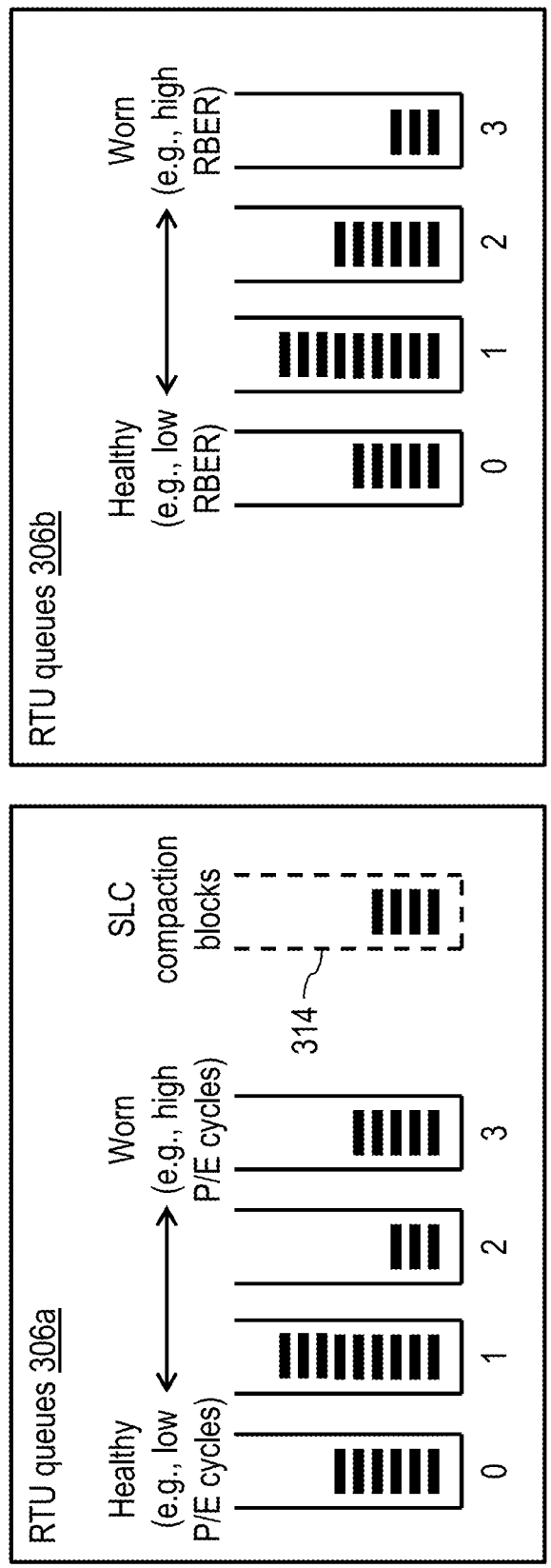
FIG. 3B depicts an example of health binning for a low-density storage pool and a high-density storage pool in accordance with one embodiment.

Referring now to FIG. 3B, there is depicted an example of health binning for a low-density storage pool and a high-density storage pool in accordance with one embodiment. As noted above, in one exemplary implementation of the embodiment of FIG. 3A, flash management code running on the GPP 132 tracks erased physical blocks 204 that are ready to be used and configured in a low-density storage mode in RTU queues 306a and similarly tracks erased physical blocks 204 that are ready to be used and configured in a high-density storage mode in RTU queues 306b. In the illustrated example, each of RTU queues 306a and 306b includes four RTU queues labeled as queues 0 to 3, where queue 0 holds identifiers of the healthiest blocks, queue 1 holds identifier of less healthy blocks, queue 2 holds identifiers of even less healthy blocks, and queue 3 holds identifiers of the least healthy blocks. As discussed below, in some embodiments, RTU queue 306a may optionally include a separate RTU queue 314 for tracking identifiers of physical blocks 204 in the low-density storage mode that are utilized for low-density-to-high-density storage compaction, as discussed further herein.

It should be noted that in an exemplary embodiment, the basis for health grading can differ for blocks configured in the different storage modes. For example, the flash management code may assign physical blocks 204 configured in the low-density storage mode to RTU queues 306a based solely on P/E cycle count, but may assign physical blocks 204 in the high-density storage mode to RTU queues 306b based on an overall health metric that accounts for P/E cycling, data retention effects, etc. Once such health metric is a worst page or mean raw bit error rate (RBER).

Figure 4:
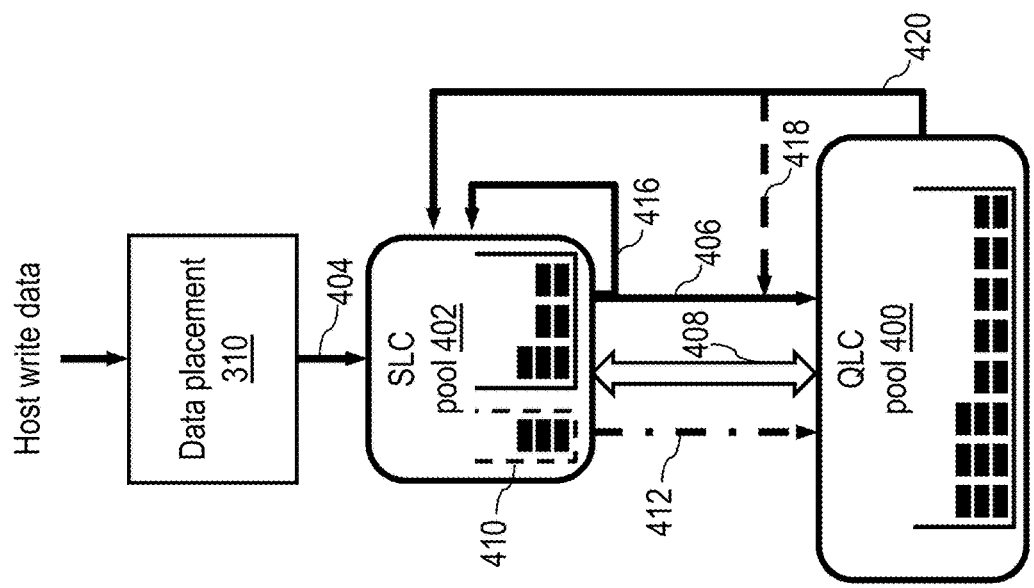
FIG. 4 depicts an exemplary hybrid storage architecture in accordance with one embodiment.

Referring now to FIG. 4, there is depicted an exemplary hybrid storage architecture in accordance with one embodiment. In this specific example, a GPP 132 and/or flash controller 140 (referred to generally herein as a "controller") configures some or all of flash memory storage devices 152 in a NAND flash memory system 150 to implement two (or more) pools 400, 402 of physical blocks 204, as discussed above with reference to FIG. 3. In this example, memory array 202 comprises, for example, QLC flash memory having a native storage capacity of four bits per cell. The controller assigns some of the physical blocks 204 in the memory array 202 of a flash storage device 152 to a QLC pool 400 in which fully programmed blocks store four bits per cell and assigns other physical blocks 204 of the memory array 202 to an SLC pool 402 in which fully programmed blocks store only a single bit per cell. As noted above, operating blocks in multiple different storage modes in this manner can provide improved performance and/or endurance if pools 400, 402 are managed appropriately.

In the depicted embodiment, the controller organizes the QLC pool 400 and SLC pool 402 in a tiered arrangement in which write data contained in host write requests are, by default, initially written into physical blocks 204 selected from SLC pool 402, as indicated by default path 404. As SLC pool 402 fills through use and more capacity is needed and/or desired in SLC pool 402, the controller can destage data from SLC pool 402 to QLC pool 400 via SLC-to-QLC relocation write requests, as indicated by arrow 406. The controller further may also destage data from SLC pool 402 to QLC pool 400 in the course of performing garbage collection in each of the pools or pool balancing. In particular, arrow 416 indicates SLC-to-SLC garbage collection, arrow 418 indicates optional QLC-to-QLC garbage collection, and arrow 420 indicates QLC-to-SLC relocation for pool rebalancing.

To ensure an optimal size of each pool 400, 402 as well as an adequate supply of free physical blocks 204 in both of block pools 400 and 402 as the physical blocks 204 are subjected to wear, the controller (e.g., via garbage collection and wear leveling function 312) additionally dynamically transfers (reassigns) physical blocks 204 between pools 400 and 402 as needed and/or desired to provide storage capacity and/or endurance in each pool. To do so, the controller may use, for example, the total data utilization, relative pool utilizations, workload properties such as the write skew, data rates, or I/O rates, RTU queue levels, write amplification, block wear, and/or block health grades. The transfer of physical blocks 204 (as opposed to data) between block pools 400 and 402 is depicted in FIG. 4 by arrow 408.

In normal operation, data placement function 310 writes all write data of host write requests into physical blocks 204 belonging to SLC pool 402. In normal operation, during garbage collection all still-valid data garbage-collected from physical blocks in SLC pool 402 by garbage collection and wear leveling function 312 is destaged to physical blocks 204 belonging to QLC pool 400. Note that, when the total data utilization is low enough such that all data can be stored in the SLC pool 402, garbage collection and wear leveling function 312 may also relocate still valid data to the SLC pool 402. But with increasing data utilization, write amplification from garbage collection and wear leveling of data from the SLC pool 402 back to the SLC pool 402 increases disproportionally high, such that destaging still-valid data to the QLC pool 400 is preferable. Still-valid data that is garbage collected from physical blocks in QLC pool 400 are also written back into physical blocks 204 belonging to QLC pool 400. During normal operation, SLC data utilization varies as a function of the host write workload skew. In normal operation, the controller automatically and dynamically adjusts its destaging behavior in response to data utilization imbalances. For example, if data utilization of SLC pool 402 is relatively low, for example, as indicated by the amount of invalidated data in the SLC occupied block queues 302 relative to the total capacity of SLC pool 402 being greater than a relative utilization threshold, the controller destages little data from SLC pool 402 to QLC pool 400; if, however, data utilization of SLC pool 402 is relatively high, for example, as indicated by the amount of invalidated data in the SLC occupied block queues 302 relative to the total capacity of SLC pool 402 being more than the relative utilization threshold, the controller destages more data from SLC pool 402 to QLC pool 400. If data placement function 310 detects a potential imbalance between the data utilization of pools 400, 402, for example, based on the fill level of the RTU queue(s) 306 of SLC pool 402 being less than a minimum fill threshold, the controller may temporarily partially or fully restrict host writes to physical blocks 204 belonging to SLC pool 402 and employ QLC pool 400 instead. An imbalance in the data utilization of the storage pools 400, 402 can also arise based on the selected data placement strategy. This is because every host write to an in-use LBA invalidates data in either the SLC or QLC pool; however, depending on the data placement, new host writes can cause an imbalance in the relative data utilizations of the pools as data placement may not replace the invalidated data in the same pool. This effect can be exacerbated when compression is applied because new host write data typically do not compress to the same size as data already stored in the SLC and QLC pools.

In some embodiments, the controller optionally implements SLC-to-QLC compaction, meaning that data to be written to physical blocks 204 in QLC pool 400 are first written into selected SLC blocks in SLC pool 402 and then written from those SLC blocks to QLC blocks in QLC pool 400, as shown by arrow 412. The SLC blocks utilized to perform SLC-to-QLC compaction can be identified in a compaction queue 410. If SLC-to-QLC compaction is implemented, arrow 420 additionally represents QLC-to-QLC garbage collection writes with compaction, and arrow 412 additionally represents SLC-to-QLC destaging with compaction.

Implementing SLC-to-QLC compaction permits a significant reduction of the size of write cache 146 as data for all open word lines are no longer required to be kept in write cache 146 to prevent possible data loss. SLC-to-QLC compaction also has the benefits of reducing RBER degradation due to long open-block times in QLC pool 400 and improving overall internal bandwidth utilization. However, SLC-to-QLC compaction increases wear on the SLC blocks utilized for compaction because every full block data placement to QLC pool 400 requires five P/E cycles (i.e., four P/E cycles for the SLC blocks and one P/E cycle for the QLC block). Employing SLC-to-QLC compaction also reduces the effective storage capacity of a NAND flash memory system 150 due to the (non-negligible) number of SLC blocks allocated for compaction.

The increased wear on SLC blocks attributable to implementing SLC-to-QLC compaction can be reduced by configuring the controller to implement one or more wear-reducing strategies. These wear-reducing strategies include selectively directing host write data directly to QLC pool 400, refraining from performing compaction for SLC-to-QLC block mode transitions, reducing a rate of QLC-to-QLC garbage collection, and relocating data from SLC pool 402 and/or QLC pool 400 to fill QLC blocks. In addition, the controller may maintain data in a valid state in its original storage location until the interfaces of the corresponding pages are closed. The corresponding pages can be grouped into page groups consisting of pages on the same word line and/or layer or pages for which common threshold voltage shift values are maintained by a calibration process. A page group can be denoted as closed or complete, when all pages of the page group have been fully programmed. Maintaining data in its original storage location until page interfaces are closed entails tracking LBAs being moved and delaying updates to LPT table 300 and LPT cache 301. In the disclosed embodiment, L2P cache 303 can be utilized to track LBAs being moved until the relevant page interfaces are closed.

Figure 5:
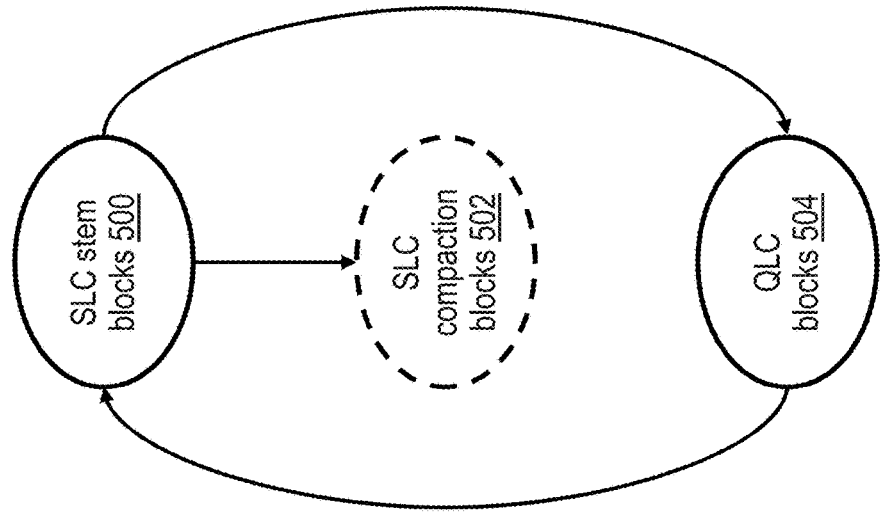
FIG. 5 illustrates an exemplary block storage mode diagram in accordance with one embodiment.

With reference now to FIG. 5, there is illustrated an exemplary storage mode diagram in accordance with one embodiment. In this embodiment, the controller (e.g., flash controller 140 and/or GPP 132) initially configures all physical blocks 204 as SLC stem blocks 500, meaning that SLC pool 402 is initially full and QLC pool 400 is initially empty. As a NAND flash memory system 150 begins to accumulate wear and utilization increases, the controller performs pool resizing by converting a selected number of SLC stem blocks 500 to QLC blocks 504. As explained in detail below, the controller can determine the number of blocks to convert between the SLC and QLC modes based, for example, on wear profiles of SLC and QLC blocks and the satisfaction of a selected write utilization constraint (e.g., a minimum or maximum DWPD). In implementations in which SLC-to-QLC compaction is employed, the controller assigns a fraction of the number of blocks allocated as QLC blocks 504 as SLC compaction blocks 502, which are dedicated for use in compacting data in SLC pool 402 for subsequent storage in QLC pool 400. In a preferred embodiment, the allocation of a physical block 204 as a SLC compaction block 502 is irreversible, meaning that the controller preferably refrains from reassigning any of SLC compaction blocks 502 as SLC stem blocks 500 or QLC blocks 504. This is motivated by the characteristic of certain NAND flash devices in which the endurance in P/E cycles of a block in SLC mode is typically significantly higher (e.g., up to 20 times or more), but when a block used in SLC mode will be used later in QLC mode, the P/E cycles in SLC mode cause similar wear to a P/E cycle in QLC mode.

Figure 6:
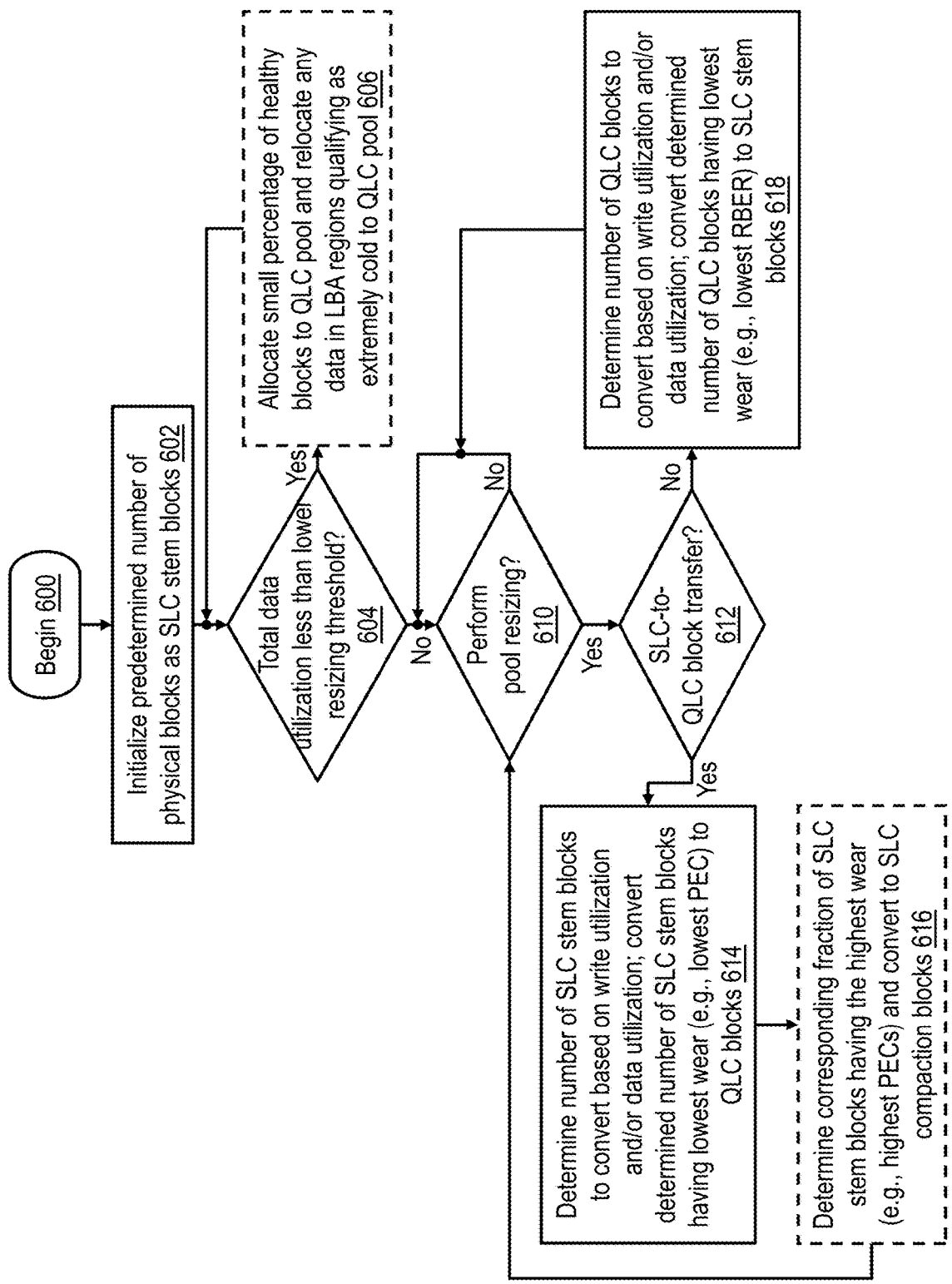
FIG. 6 is a high-level logical flowchart of an exemplary process of resizing storage pools in a hybrid storage architecture in accordance with one embodiment.

Referring now to FIG. 6, there is depicted a high-level logical flowchart of an exemplary process of resizing storage pools in a hybrid storage architecture in accordance with one embodiment. The process of FIG. 6 can be performed, for example, by a controller (e.g., flash controller 140 and/or GPP 132).

The process of FIG. 6 begins at block 600 and then proceeds to block 602, which illustrates the controller initializing a predetermined number (e.g., all) physical blocks 204 of a NAND flash memory system 150 to operate in a low-density storage mode, which for simplicity will hereafter be assumed to be SLC mode. Thus, in at least some embodiments, when NAND flash memory system 150 is first placed in service, all physical blocks 204 are assigned to SLC pool 402, QLC pool 400 is empty, and all host read and write requests are serviced with reference to physical blocks 204 assigned to SLC pool 402. This arrangement advantageously provides high performance while data utilization and wear are low. At block 604, the controller determines whether or not the total data utilization of NAND flash memory system 150 remains less than a lower resizing threshold. In some implementations, the lower resizing threshold is approximately 15 to 25% of the nominal storage capacity of NAND flash memory system 150. In response to an affirmative determination at block 604, the controller refrains from performing resizing of storage pools 400 and 402 based on data utilization and/or write utilization. However, as indicated at block 606, the controller may optionally transfer a small percentage (e.g., approximately 5% or less) of blocks from SLC pool 402 to QLC pool 400 for the purpose of compactly storing data of extremely "cold" (i.e., seldom accessed) LBA regions.

Referring again to block 604, in response to a determination that the total data utilization is greater than or equal to the lower resizing threshold, the controller determines at block 610 whether or not to perform pool resizing of storage pools 400 and 402 at the present time. The controller may make the determination depicted at block 610 based, for example, on elapse of a predetermined time interval since pool resizing was previously performed, computed write utilization of the NAND flash memory system 150, relative pool utilizations of SLC pool 402 and QLC 400, and/or operation of the background health checker. In response to a negative determination at block 610, the process of FIG. 6 iterates at block 610.

In response to the controller determining at block 610 to perform pool resizing, the controller additionally determines at block 612 whether or not to perform a transfer of physical blocks 204 from SLC pool 402 to QLC pool 404. In some embodiments, the controller may make the determination depicted at block 612, for example, based on whether the observed write utilization of NAND flash memory system 150 is greater or less than a specified threshold write utilization (e.g., 1 DWPD) that NAND flash memory system 150 is required to support while still achieving a useful life of at least a predetermined duration (e.g., a period of years). In response to an affirmative determination at block 612, the controller determines a number of SLC stem blocks 500 to convert to QLC blocks 504 based on the observed write utilization and/or data utilization and converts the storage mode of the determined number of SLC stem blocks 500 to QLC blocks 504. In a preferred embodiment, the controller selects as candidates for SLC-to-QLC storage mode conversion those ready-to-use SLC stem blocks 500 having relatively lower wear (e.g., lower P/E cycle counts), for example, those identified in queue 0 of RTU queues 306a. Note that any still valid data stored on physical blocks subject to being transferred must be relocated prior to the transfer such that the physical block is fully invalidated and the target pool of data being relocated is independent of the target of the physical block being transferred.

In embodiments in which the controller is configured to not perform SLC-to-QLC compaction, the process returns from block 614 directly to block 610, which has been described. If, however, the controller is configured to perform SLC-to-QLC compaction, increasing the number of QLC blocks 504 in QLC pool 400 will cause more wear on SLC blocks due to the compaction writes being made to SLC blocks prior to QLC blocks. Accordingly, the process of FIG. 6 passes from block 614 to block 616, which illustrates the controller determining a minor fraction of the number of SLC stem blocks 500 determined at block 614 and permanently designating those SLC stem blocks 500 as SLC compaction blocks 502. In a preferred embodiment, the controller selects for designation as SLC compaction blocks 502 those SLC stem blocks 500 exhibiting the highest wear (e.g., highest P/E cycle counts). In the embodiment of FIG. 3B, these SLC stem blocks 500 can conveniently be drawn from those identified in queue 3 of RTU queues 306a.

In one preferred embodiment, the controller determines the number of SLC blocks to designate as SLC compaction blocks 502 at block 616 such that SLC compaction blocks 502 wear out at approximately the same rate as QLC blocks 504. It should be noted that the SLC compaction blocks typically endure significantly more P/E cycles than QLC blocks. The controller can make this determination, for example, utilizing the following equation:

$$\# SLC \text{ compaction blocks} = \frac{4 \cdot E_{QLC\_max}}{E_{SLC\_max} + 4 \cdot E_{QLC\_max}}$$

where:
$E_{SLC\_max}$=Maximum SLC endurance expressed in P/E cycles; and
$E_{QLC\_max}$=Maximum QLC endurance expressed in P/E cycles.

Following block 616, if present, the process returns to block 610, which has been described.

Returning to block 612, in response to the controller instead determining to transfer blocks from QLC pool 400 to SLC pool 402, the process passes to block 618. Block 618 depicts the controller determining a number of QLC blocks 504 to be converted into SLC stem blocks 500 based on the observed write utilization and/or data utilization of NAND flash memory system 150. The controller then converts the storage mode of the determined number of QLC blocks 504 to SLC stem blocks 500. In a preferred embodiment, the controller selects as candidates for QLC-to-SLC storage mode conversion those ready-to-use QLC blocks 504 having relatively lower wear (e.g., lower RBERs), for example, those identified in queue 0 of RTU queues 306b. Following block 618, the process of FIG. 6 returns to block 610, which has been described. In some embodiments, the storage mode conversion depicted at block 618 is further qualified, for example, by a determination of whether or not a predetermined maximum number of SLC compaction blocks 502 has been reached. In particular, the controller can determine to not perform any QLC-to-SLC block conversions if number of SLC compaction blocks 502 already satisfies a predetermined maximum number of SLC compaction blocks 502. In addition, QLC-to-SLC block conversion does not affect the number of SLC compaction blocks although the smaller QLC pool would require fewer SLC compaction blocks 502. This is preferred when the wear of SLC compaction blocks 502 is higher than those of SLC stem blocks 500. Only when the wear of a SLC compaction block 502 is lower than the wear of an existing SLC stem block 500, the SLC compaction pool could be reduced by moving the SLC compaction block 502 to the SLC stem block pool.

In the example of FIG. 6, relative level of wear is the primary criterion for selecting blocks to be transferred between SLC pool 402 and QLC pool 400. In other embodiments, other or additional rules may be utilized to select blocks for transfer, which, for example, may consider workload properties or the relative increase in wear of the blocks in one or more of pools 400 and 402, as will be understood by those skilled in the art.

Figure 7:
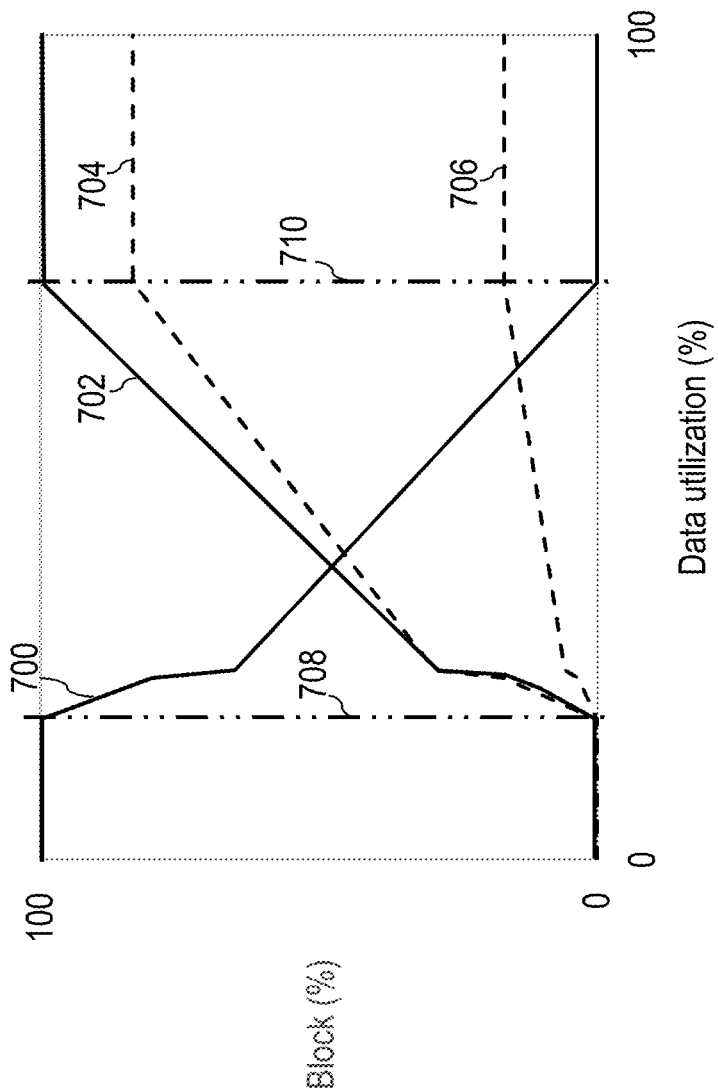
FIG. 7 is graph of the percentages of SLC stem blocks, SLC compaction blocks, and QLC blocks versus data utilization in a hybrid storage system in accordance with one embodiment.

FIG. 7 is graph illustrating the change in the percentages of SLC stem blocks, SLC compaction blocks, and QLC blocks versus data utilization in a hybrid storage system in accordance with one embodiment. In FIG. 7, curve 700 represents the percentage of physical blocks 204 configured as SLC stem blocks 500; curve 702 represents the percentage of physical blocks 204 configured as QLC blocks 504 assuming SLC-to-QLC compaction is not implemented; curve 704 represents the percentage of physical blocks 204 configured as QLC blocks 504 assuming implementation of SLC-to-QLC compaction; and curve 706 represents the percentage of physical blocks 204 assigned for use as SLC compaction blocks 504.

As represented by curve 700, when a NAND flash storage system 150 is placed into service (i.e., when data utilization is 0% of the stated capacity of NAND flash storage system 150), all physical blocks 204 are initialized to operate in the SLC mode and are designated as SLC stem blocks 500, as described above with reference to block 602 of FIG. 6. This condition continues until the data utilization of NAND flash memory system 150 exceeds lower resizing threshold 708, as discussed above with reference to block 604 of FIG. 6. At increasingly higher levels of data utilization of NAND flash memory system 150, the controller performs resizing of storage pools 400 and 402 as discussed with reference to blocks 610 to 618 of FIG. 6. Thus, at increasing data utilizations above lower resizing threshold 708, the percentage of QLC blocks 504 increases while the percentage of SLC stem blocks 500 decreases. In embodiments in which SLC-to-QLC compaction is implemented, the percentage of QLC blocks increases more slowly than if no compaction is implemented (as seen by comparison of curves 702 and 704) due to the allocation of a percentage of SLC stem blocks 500 to serve as SLC compaction blocks 502, as indicated by curve 706. In the specific embodiment illustrated in FIG. 7, no further pool resizing is performed (and thus no additional allocation of SLC compaction blocks is made) if data utilization of NAND flash memory system 150 exceeds an upper resizing threshold 710, which can be, for example, between 65 and 75%, and more particularly, about 70%. In some embodiments, upper pool resizing threshold 710 instead can be denominated as a maximum percentage and/or number of SLC compaction blocks 502 (e.g., between about 5 to 25% of the total number of physical blocks 204).

Referring now to FIGS. 8A-8C, graphs are presented that depict a technique by which a controller can determine an amount of pool resizing to be performed based on write utilization and/or data utilization in a hybrid storage architecture that does not employ compaction in accordance with one embodiment. In the illustrated pool resizing technique, the controller optimizes a NAND flash memory system 150 for performance by employing the maximum possible size of SLC pool 402 permitted by the observed write utilization (e.g., expressed in DWPD), the data utilization, and a predetermined longevity constraint (e.g., minimum useful life). Based on these criteria, the controller is configured to gradually decrease SLC pool size at constant utilization if write utilization is excessive. This pool resizing technique allows the controller to take advantage of the fact that in commercial deployments the write utilization of NAND flash memory systems 150 is typically lower than the stated drive specifications and thus a larger size of SLC pool 402 can be maintained.

In one embodiment, the pool resizing performed by the controller can be expressed mathematically, for example, as follows:

$$PS_{SLC\_max} = \min(PS_{SLC\_util}, PS_{SLC\_dwpd}),$$

where:
- $PS_{SLC\_max}$ is the maximum possible SLC stem block pool size expressed in percentage of the stated storage capacity of NAND flash memory system 150,
- $PS_{SLC\_util}$ is the maximum possible SLC stem block pool size determined based on data utilization, and
- $PS_{SLC\_dwpd}$ is the maximum possible SLC stem block pool size determined based on write utilization.

FIGS. 8A-8C graphically illustrate the controller performing this minimization computation for given memory characteristics (which can be empirically determined by characterization testing and/or supplied by the memory manufacturer) and operating conditions. In particular, FIG. 8A depicts a curve 800 that relates the percentage of the storage capacity of NAND flash memory system 150 configured as SLC stem blocks 500 to an observed maximum write utilization of NAND flash memory system 150 expressed in DWPD; FIG. 8B illustrates a curve 802 that relates the data utilization of NAND flash memory system 150 to a currently measure write utilization expressed in DWPD; and FIG. 8C depicts a curve 804 that relates data utilization of NAND flash memory system 150 to the percentage of the storage capacity of NAND flash memory system 150 configured as SLC stem blocks 500. Based on the data represented by curves 800, 802, and 804, the controller can determine both $PS_{SLC\_util}$ and $PS_{SLC\_dwpd}$ and thus the minimum of the two pool sizes, which provides maximum allowable number of SLC stem block 500. Given the currently allocated number of SLC stem blocks 500, the controller can then determine the number of SLC stem blocks 500 to be increased or decreased in the pool resizing operation depicted at block 610-618 of FIG. 6.

In the example of FIGS. 8A-8C, it is assumed that the maximum write utilization measured for NAND flash memory system 150 is 0.77 DWPD and that data utilization of NAND flash memory system 150 is currently 40%. FIG. 8C depicts at data point 806 that at 40% utilization $PS_{SLC\_util}$ is 41%. FIG. 8A further illustrates at data point 808 that with a maximum write utilization at 0.77 DWPD $PS_{SLC\_dwpd}$ is 31%. Thus, in this example, $PS_{SLC\_max}$, which is the minimum of these quantities, is 31%. If the workload would be less than 0.69 DWPD, $PS_{SLC\_max}$ could be set to 41%.

FIGS. 9A-9C depict application of the same technique for determining the amount of pool resizing can be applied by a controller configured to perform SLC-to-QLC compaction. FIG. 9A depicts a curve 900 that relates the percentage of the storage capacity of NAND flash memory system 150 configured as SLC stem blocks 500 to an observed maximum write utilization of NAND flash memory system 150 expressed in DWPD; FIG. 9B illustrates a curve 902 that relates the data utilization of NAND flash memory system 150 to a currently measure write utilization expressed in DWPD; and FIG. 9C depicts a curve 904 that relates data utilization of NAND flash memory system 150 to the percentage of the storage capacity of NAND flash memory system 150 configured as SLC stem blocks 500. It should be noted that FIG. 9C additionally includes a curve 905 depicting the allocation of SLC compaction blocks 502 as a function of data utilization. The allocation of SLC compaction blocks 502 results in a lower maximum write utilization than if compaction were not employed, as can be seen in FIG. 9A by comparison of curve 900 with corresponding curve 800 of FIG. 8A.

In the example of FIGS. 9A-9C, it is again assumed that the maximum write utilization observed in NAND flash memory system 150 is 0.77 DWPD, and the data utilization of NAND flash memory system 150 is 40% utilization. From FIG. 9A, it can be observed that the maximum SLC stem block pool size for a maximum write utilization of 0.77 is 12.8%, and from FIG. 9C, it is be observed that the maximum SLC stem block pool size determined based on data utilization is 41.5%. Thus, in this example, $PS_{SLC\_max}$=min $(PS_{SLC\_util}, PS_{SLC\_dwpd})$ 12.8%.

It is presently preferred that the controller determines write utilization over a significantly longer time period than pool resizing. In particular, the controller may be configured to determine write utilization over a time period that is 3 to 4 orders of magnitude longer than the period employed for performing pool resizing. For example, the controller may be configured to determine maximum write utilization over a period of one or more days or weeks and to perform pool resizing based on a time period of seconds or minutes. In tracking the elapse of time, the controller can advantageously employ timestamps and the time tracking already employed in scheduling the periodic read sweeps performed by the background health checker.

Referring now to FIGS. 10A-10B, two graphs are given representing differing exemplary techniques by which a controller can determine write utilization of a non-volatile memory system in accordance with one or more embodiments. In a first technique represented by FIG. 10A, which graphs write utilization versus time, the controller calculates the write utilization (i.e., DWPD) represented by curve 1000 as the total number of blocks written with host write data divided by the number of blocks in NAND flash memory system 150 divided by the service lifetime of NAND flash memory system 150 expressed in days. As shown, because the write utilization is averaged over the entire elapsed lifetime of the NAND flash memory system 150, the write utilization represented by curve 1000 is slow to respond to workload changes represented by a current (e.g., daily measured) write utilization represented by curve 1002. The responsiveness to workload changes declines as the lifetime of NAND flash memory system 150 elapses and more write utilization history is included in the write utilization calculation. In this approach, the lifetime average of write utilization, rather than the current write utilization, is effectively utilized as a predictor of future write utilization.

FIG. 10B illustrates the beneficial effect of employing an alternative technique for calculating write utilization that is more responsive to workload changes and thus advantageously can allow a greater allocation of physical blocks 204 to SLC pool 402 in response to decreases in write utilization as compared to the first technique depicted in FIG. 10A. In the second technique of FIG. 10B, which presents the maximum allowable size of SLC pool 402 ($PS_{SLC\_max}$) versus time, the current daily-measured write utilization (rather than the lifetime average write utilization) is employed as an estimate of the future workload write utilization, and prior write utilization can be utilized to impact the computation the write utilization if "excessive." For example, in the second technique write utilization can be expressed by the following system of equations:

$$DWPD = DWPD_{Current} - DWPD_{Excess}$$

$$DWPD_{Excess} = \frac{(DWPD_{Past} - DWPD_{Spec}) \cdot t_{elapsed}}{T_{lifetime} - t_{elapsed}}$$

where:
- $DWPD_{Current}$ is the current write utilization measured over a relatively short current time period (e.g., one day), DWPD$_{Past}$ is the average write utilization over the elapsed lifetime of NAND flash memory system 150 preceding the current time period, DWPD$_{Spec}$ is the write utilization specification for NAND flash memory system 150 (e.g., 1 DWPD), t$_{elapsed}$ is the elapsed number of days in the lifetime of NAND flash memory system 150, and T$_{lifetime}$ is the useful lifetime specified for NAND flash memory system 150.

As shown in FIG. 10B by curve 1004, this second technique of computing write utilization enables the controller to quickly adjust PS$_{SLC\_max}$ in response to workload changes when the workload properties follow the same write utilization measured daily as shown in curve 1002 from FIG. 10A. In contrast, the controller resizes SLC pool 402 more slowly utilizing the first technique, as indicated by curve 1006.

As has been described, a non-volatile memory includes physical blocks each including a respective plurality of cells, where each cell is capable of storing multiple bits of data.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured to dynamically resize the low-density and the high-density pools based on data utilization of the non-volatile memory.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller dynamically resizes the low-density and the high-density pools based on data utilization of the non-volatile memory. Resizing the low-density and high-density pools can include determining a number of physical blocks to transfer between the low-density and high-density pools based on a minimum of a first pool size determined based on write utilization and a second pool size determined based on data utilization.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller initially dynamically resizes the low-density and high-density pools based on the data utilization exceeding a pool resizing threshold.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that, based on transferring some of the physical blocks in the low-density pool into the high-density pool, the controller permanently allocates a subset of the physical blocks in the low-density pool as compaction blocks dedicated to compaction of data written into physical blocks of the low-density pool for storage in physical blocks of the high-density pool.

In at least one embodiment, a controller maintains dynamically resizable pools of the physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured to determine write utilization of the non-volatile memory system based on an elapsed portion of a projected lifetime of the non-volatile memory and an average write utilization over the elapsed portion.

In at least one embodiment, a controller maintains dynamically resizable pools of physical blocks, including at least a low-density pool in which cells are configured to store fewer bits and a high-density pool in which cells are configured to store more bits. The controller repeatedly dynamically resizes the low-density and the high-density pools based on write utilization of the non-volatile memory. The controller can be configured such that the controller dynamically resizes the low-density and the high-density pools based on data utilization of the non-volatile memory. In some embodiments, the controller can determine a number of physical blocks to transfer between the low-density and high-density pools based on a minimum of a first pool size determined based on write utilization and a second pool size determined based on data utilization. In some embodiments, the controller can be configured such that the controller initially dynamically resizes the low-density and high-density pools based on the data utilization exceeding a pool resizing threshold. In some embodiments, the controller can be configured such that, based on transferring some of the physical blocks in the low-density pool into the high-density pool, the controller permanently allocates a subset of the physical blocks in the low-density pool as compaction blocks dedicated to compaction of data written into physical blocks of the low-density pool for storage in physical blocks of the high-density pool. In some embodiments, the controller can be configured to determine write utilization of the non-volatile memory system based on an elapsed portion of a projected lifetime of the non-volatile memory and an average write utilization over the elapsed portion. In some cases, multiple of these embodiments can be implemented in combination.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signalsper se, and energy per se.

In addition, although embodiments have been described that include use of a NAND flash memory, it should be appreciated that embodiments of the present invention can also be used with any other type of non-volatile random access memory (NVRAM). Further, although embodiments have been described that employ two pools of blocks, it should be appreciated that the controller may employ a greater number of block pools.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. References herein to an embodiment do not necessarily all refer to the same embodiment, and features of different embodiments can be utilized in combination, as would be understood by those skilled in the art. Lastly, the use of a singular term, such as, but not limited to, "a" is not intended as limiting the number of items.

What is claimed is:

1. A method of operating a non-volatile memory including a plurality of physical blocks of storage each including a respective plurality of cells, wherein each of the plurality of cells is individually capable of storing multiple bits of data, the method comprising:
   a controller for the non-volatile memory maintaining dynamically resizable pools of physical blocks including at least a low-density pool of physical blocks and a high-density pool of physical blocks, wherein cells of physical blocks in the low-density pool are configured to store a fewer number of bits than cells of physical blocks in the high-density pool; and
   the controller repeatedly dynamically resizing the low-density and the high-density pools based on write utilization of the non-volatile memory, wherein the write utilization is an amount of data written to the non-volatile memory per time period.

2. The method of claim 1, wherein the resizing includes dynamically resizing the low-density and the high-density pools based on data utilization of the non-volatile memory.

3. The method of claim 2, wherein the resizing includes determining a number of physical blocks to transfer between the low-density and high-density pools based on a minimum of a first pool size determined based on write utilization and a second pool size determined based on data utilization.

4. The method of claim 1, wherein the resizing includes initially dynamically resizing the low-density and the high-density pools based on the data utilization exceeding a pool resizing threshold.

5. The method of claim 1, further comprising:
   based on transferring at least one of the physical blocks in the low-density pool into the high-density pool, permanently allocating a subset of the physical blocks in the low-density pool as compaction blocks dedicated to compaction of data written into physical blocks of the low-density pool for storage in physical blocks of the high-density pool.

6. The method of claim 1, further comprising the controller determining write utilization of the non-volatile memory system based on an elapsed portion of a projected lifetime of the non-volatile memory and an average write utilization over the elapsed portion.

7. A data storage system, comprising:
   a controller for a non-volatile memory including a plurality of physical blocks of storage each including a respective plurality of cells, wherein each of the plurality of cells is individually capable of storing multiple bits of data, wherein the controller is configured to perform:
      maintaining dynamically resizable pools of physical blocks including at least a low-density pool of physical blocks and a high-density pool of physical blocks, wherein cells of physical blocks in the low-density pool are configured to store a fewer number of bits than cells of physical blocks in the high-density pool of physical blocks; and
      repeatedly dynamically resizing the low-density and the high-density pools based on write utilization of the non-volatile memory, wherein the write utilization is an amount of data written to the non-volatile memory per time period.

8. The data storage system of claim 7, wherein the resizing includes dynamically resizing the low-density and the high-density pools based on data utilization of the non-volatile memory.

9. The data storage system of claim 8, wherein the resizing includes determining a number of physical blocks to transfer between the low-density and high-density pools based on a minimum of a first pool size determined based on write utilization and a second pool size determined based on data utilization.

10. The data storage system of claim 7, wherein the resizing includes initially dynamically resizing the low-density and the high-density pools based on the data utilization exceeding a pool resizing threshold.

11. The data storage system of claim 7, wherein the controller is configured to perform:
   based on transferring at least one of the physical blocks in the low-density pool into the high-density pool, permanently allocating a subset of the physical blocks in the low-density pool as compaction blocks dedicated to compaction of data written into physical blocks of the low-density pool for storage in physical blocks of the high-density pool.

12. The data storage system of claim 7, wherein the controller is configured to perform:
   determining write utilization of the non-volatile memory system based on an elapsed portion of a projected lifetime of the non-volatile memory and an average write utilization over the elapsed portion.

13. The data storage system of claim 7, further comprising the non-volatile memory.

14. A computer program product, the computer program product comprising a computer readable storage medium having program instructions embodied therewith, the program instructions being executable by a controller of a non-volatile memory including a plurality of cells each individually capable of storing multiple bits of data, wherein, when executed, the program instructions cause the controller to perform:
   maintaining dynamically resizable pools of physical blocks including at least a low-density pool of physical blocks and a high-density pool of physical blocks, wherein cells of physical blocks in the low-density pool are configured to store a fewer number of bits than cells of physical blocks in the high-density pool of physical blocks; and repeatedly dynamically resizing the low-density and the high-density pools based on write utilization of the non-volatile memory, wherein the write utilization is an amount of data written to the non-volatile memory per time period.

15. The computer program product of claim 14, wherein the resizing includes dynamically resizing the low-density and the high-density pools based on data utilization of the non-volatile memory.

16. The computer program product of claim 15, wherein the resizing includes determining a number of physical blocks to transfer between the low-density and high-density pools based on a minimum of a first pool size determined based on write utilization and a second pool size determined based on data utilization.

17. The computer program product of claim 14, wherein the resizing includes initially dynamically resizing the low-density and the high-density pools based on the data utilization exceeding a pool resizing threshold.

18. The computer program product of claim 14, wherein the program instructions cause the controller to perform:

based on transferring at least one of the physical blocks in the low-density pool into the high-density pool, permanently allocating a subset of the physical blocks in the low-density pool as compaction blocks dedicated to compaction of data written into physical blocks of the low-density pool for storage in physical blocks of the high-density pool.

19. The computer program product of claim 14, wherein the program instructions cause the controller to perform:

determining write utilization of the non-volatile memory system based on an elapsed portion of a projected lifetime of the non-volatile memory and an average write utilization over the elapsed portion.

* * * * *